United States Patent
Lin

[11] Patent Number: 6,065,939
[45] Date of Patent: May 23, 2000

[54] DRINKING WATER SUPPLY FOR AUTOMOBILE PURPOSE

[76] Inventor: Yung-Fa Lin, 6F, No. 2, Lane 163, Hsin-Yi Rd., Pan-Chiao, Taipei Hsien, Taiwan

[21] Appl. No.: 09/135,000

[22] Filed: Aug. 17, 1998

[51] Int. Cl.$^7$ .............................. F04B 49/00; B60L 1/02
[52] U.S. Cl. .............................. 417/36; 219/202; 219/208
[58] Field of Search .............................. 417/36; 219/202, 219/208, 214; 392/444; 222/61, 56, 66; 137/340, 380

[56] References Cited

U.S. PATENT DOCUMENTS

| | | | |
|---|---|---|---|
| 3,558,013 | 1/1971 | Ponzo et al. | 219/208 |
| 4,034,571 | 7/1977 | Bollinger | 62/244 |
| 4,055,279 | 10/1977 | Lapera et al. | 222/54 |
| 4,140,150 | 2/1979 | Rundell | 137/340 |
| 5,497,918 | 3/1996 | Brilanchik | 222/61 |
| 5,573,142 | 11/1996 | Morellato et al. | 222/129.1 |

*Primary Examiner*—Teresa Walberg
*Assistant Examiner*—Vinod D Patel
*Attorney, Agent, or Firm*—Jacobson, Price, Holman & Stern, PLLC

[57] ABSTRACT

A "drinking water supply for automobile" comprising a main unit box body, a water take-up rack and a water storage bottle, wherein inside the main unit box body is the installation of an electric heating water tank, a control circuit and a two-way water pump, and inside the electric heating water tank is the installation of an electric heater in connection with the control circuit, a cooler and a water level sensor, said control circuit is in connection with three control switches and a sensor on the water take-up rack; between said electric heating water tank and the water storage bottle is the connection of a ventilating pipe and a water sucking pipe, on the water sucking pipe is the installation of a two-way water pump, on the water sucking pipe is the connection of a water output pipe, the sensor is located at an appropriate place at the outlet of the water output pipe; based on the above construction, the user may preset the control switches for hot water, ice water or untreated water, thereby activating the control circuit, so the two-way water pump will pump the water from the water storage bottle to the electrical heating water tank for a heating or a cooling process, then the water will be pumped in a reverse direction by the two-way water pump to the water output pipe, for the purpose of obtaining hot water, ice water or untreated drinking water at a room temperature.

1 Claim, 4 Drawing Sheets

DRINKING WATER SUPPLY FOR AUTOMOBILE PURPOSE

BACKGROUND OF THE INVENTION

A drinking water supply for automobile purpose, particularly to one that may be installed in a car, whereby a heater may serve to heat, or a cooler may serve to cool drinking water, so that either hot water, ice water or untreated water at a room temperature may be obtained on a car.

When people wish to drink hot water on an automobile, they would have to pour household hot drinking water in an easy-to-carry flask that is designed to maintain the temperature inside the flask, so that they can readily have hot water on a car for such purposes as making milk for a baby, or making coffee or tea for the motorists.

The time period for the flask to maintain the high temperature of hot water is limited, however, it could not maintain the heat for an extended period of time. Normally, hot water is not needed on a car unless after a long drive, when the hot water contained in the flask would gradually cool down to the extent that it is no longer possible to make coffee, tea or milk. As a result, when hot water is needed for making milk for a baby, the motorist will have to take hot water at somewhere during the trip, therefore, it can be quite inconvenient, and it can cause possible delay in the trip.

Or, if hot water is needed on the next day, they will have to prepare hot water before starting the car, and the preparation can be quite troublesome; in case they wish to spend the night in a countryside, they could not enjoy such convenience as an electrical heater in their home, so they have to bring along a compact burner for mountaineering purposes, the burner will be used to boil water, but such method is time-wasting and inconvenient.

In a same way, in case cool drinking water is needed, they have to bring along ice water in a container, the ice water will easily be restored to a room temperature, it could not be maintained at a low-temperature for an extended period of time; in a hot summer driving trip, drinking ice water would be impossible.

In view of such inconveniences as having to prepare hot water in a container that could contain only a small amount of hot water, and failure of the hot water to maintain its high temperature, etc., or in the same way, having to prepare ice water which temperature could not be maintained for an extended period of time, the inventor has devoted in the research and has finally come up with a drinking water supply that can be used on a car for ready access to hot water for the purposes of making coffee, tea or milk, or iced water for drinking purpose, comprising a main unit box body, a water take-up rack and a water storage bottle, wherein inside said main unit box body is the installation of an electric heating water tank, a control circuit and a two-way water pump, inside said electric heating water tank is the installation of an electric heater, a cooler and a water level sensor, which is in connection with the control circuit, said control circuit is connected to three control switches and a sensor that are installed on the water take-up rack; between said electric heating water tank and the water storage bottle is the connection of a ventilating pipe and a water sucking pipe, on the water sucking pipe in the main unit box body is the installation of said two-way water pump, between the two-way water pump and the water storage bottle is the installation of a check valve, between the check valve and the two-way water pump is the connection of a water output pipe, on the water output pipe is the installation of another check valve, the end of the water output pipe is installed on the water take-up rack, said sensor is located at an appropriate place at the outlet of the water output pipe; based on the above construction, the user may preset the control switches for hot water, ice water or untreated water at room temperature, thereby to activate the control circuit, so the water is pumped by the two-way water pump from the water storage bottle to the electrical heating water tank for heating or cooling purpose, then the two-way water pump will pump the water in a reverse direction to the water output pipe, so that hot water, ice water or untreated water at room temperature can be obtained.

SUMMARY OF THE INVENTION

The primary objective of the present invention is to present an installation of a drinking water supply in a car, thereby drinking water can be heated or cooled rapidly, so that motorists can enjoy the convenience of obtaining hot water, ice water or untreated water at room temperature on a car.

To enable better understanding of the invention, the following drawings are described in details:

DETAILED DESCRIPTION OF THE PREFERRED EMBODIMENT

Figure 1:
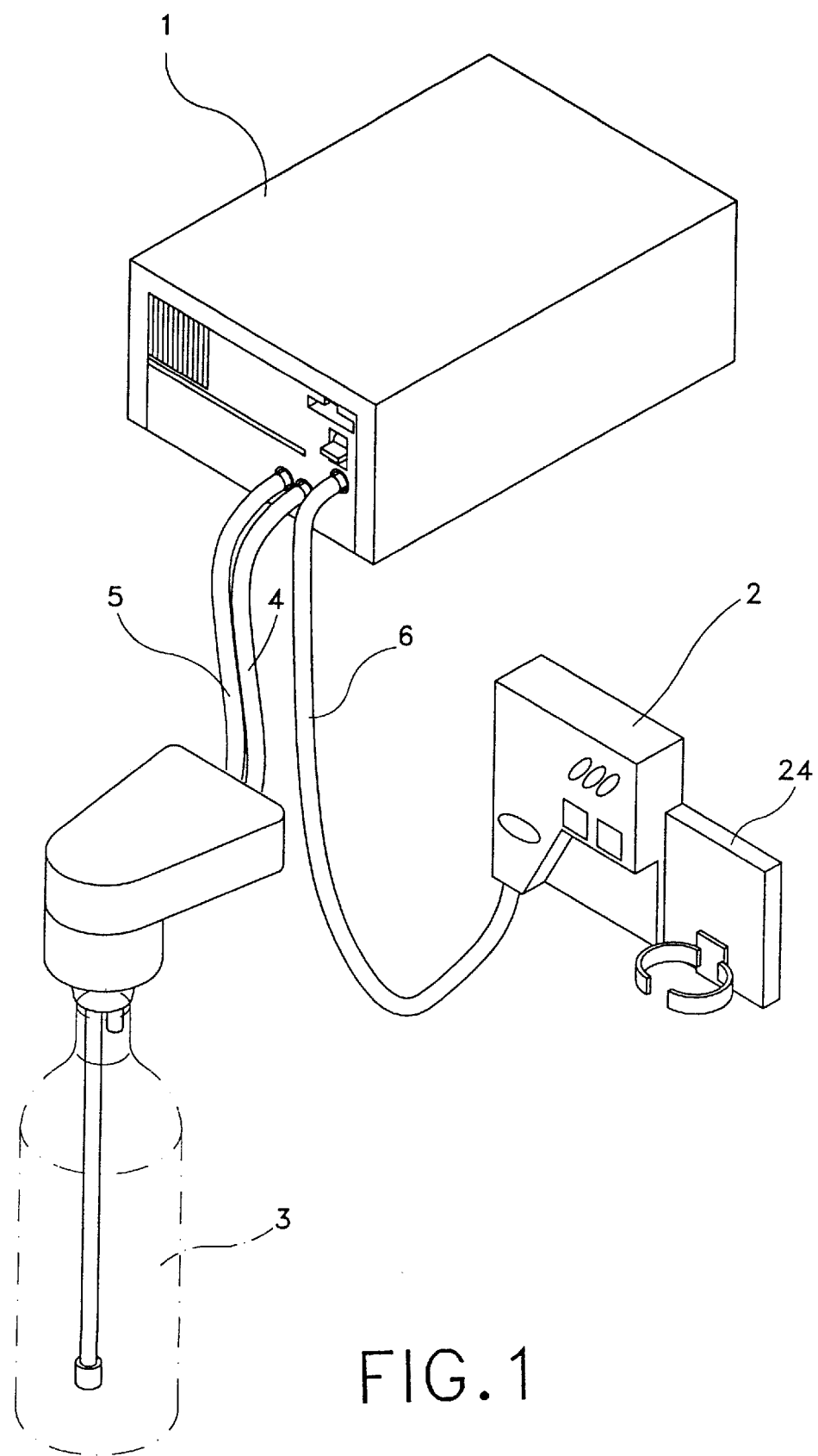
FIG. 1 is a perspective assembled view of the invention.
Figure 2:
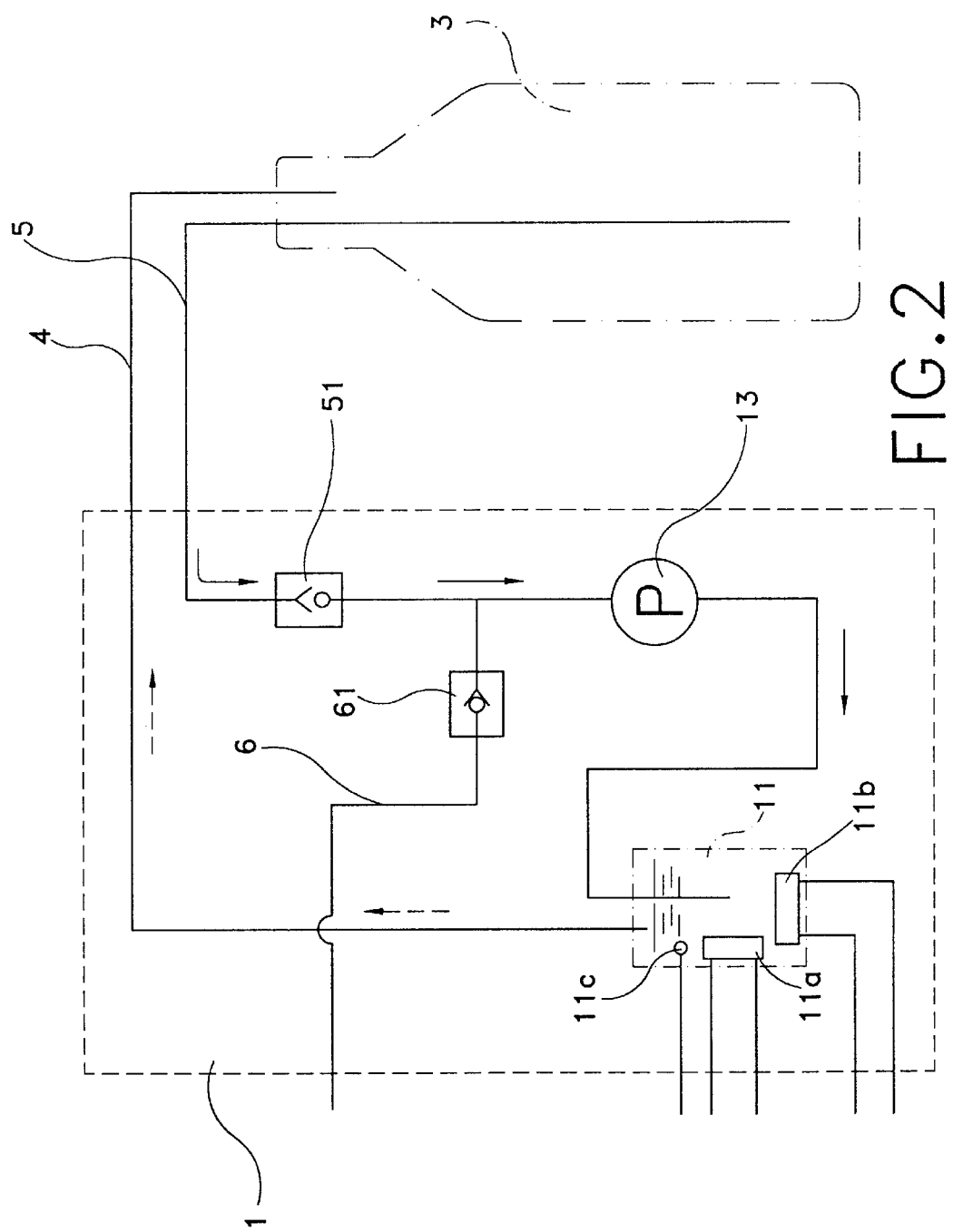
FIG. 2 is a piping view of the invention of water input movement.
Figure 3:
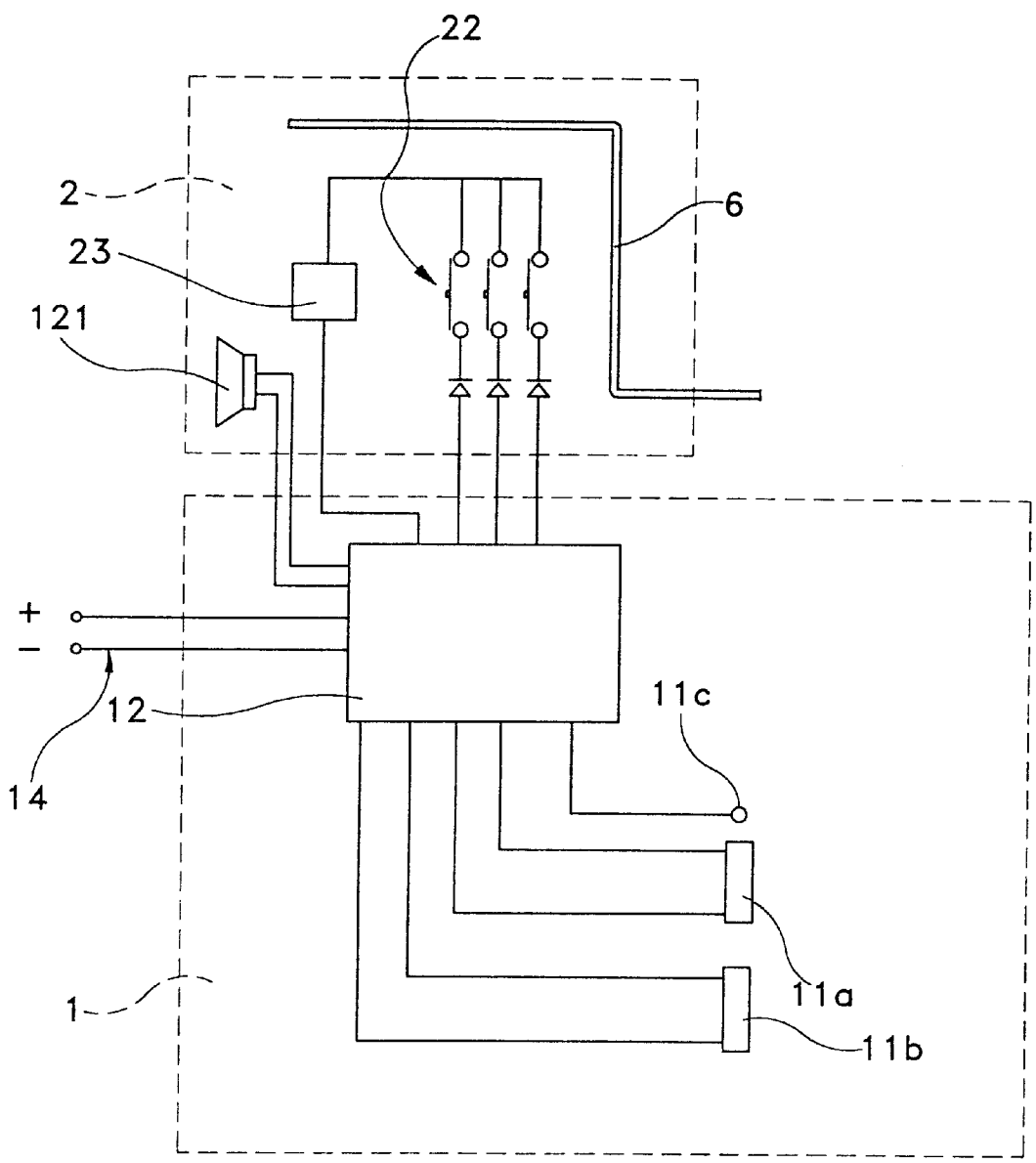
FIG. 3 is a wiring diagram of the invention.

Please refer to FIGS. 1, 2 and 3, the invention comprises a main unit box body 1, a water take-up rack 2 and a water storage bottle 3, wherein inside said main unit box body 1 is the installation of a electric heating water tank 11, a control circuit 12 and a two-way water pump 13, and inside said electric heating water tank 11 is the installation of an electric heater 11a, a cooler 11b and a water level sensor 11c, which is in connection with the control circuit 12, while said control circuit 12 is connected to three control switches 22 and a sensor 23 on the water take-up rack 2; between the electric heating water tank 11 and the water storage bottle 3 is the connection of a ventilating pipe 4 and a water sucking pipe 5, and on the water sucking pipe 5 in the main unit box body 1 is the installation of said two-way water pump 13, and between the two-way water pump 13 and the water storage bottle 3 is the installation of a check valve 51, and between the check valve 51 and the two-way water pump 13 is the connection of a water output pipe 6, on the water output pipe 6 is the installation of another check valve 61, and at the end of the water output pipe 6 is installed on the water take-up rack 2, said sensor 22 is located at an appropriate location at the outlet of the water output pipe 6; and, the water take-up rack 2 has a cup rack 24.

According to said construction, the power cable 14 of said main unit box body 1 may be connected directly to the power source on an automobile (not shown in drawings), before starting the car, the mineral water easily available at any food store or the household drinking water available in every house can be poured into the water storage bottle 3, if the user wishes to take hot water, he may set the hot water control switch 22 to activate the control circuit 12, then said two-way water pump 13 will be activated, to pump the cold water previously stored in the water storage bottle 3 to the electric heating water tank 11, then the check valve 51 of said water sucking pipe 5 will allow one-way flow of the drinking water, and the check valve 61 on the water output pipe 6 will be closed, so the unheated drinking water may flow into the electric heating water tank 11, as shown in FIG. 2, and the electric heater 11a in the electric heating water tank 11 will start to heat, and when the water drawn into the electric heating water tank 11 is sensed by the water level sensor 11c, and when the preset water level is reached, the two-way water pump 13 will stop operating; during the water pumping process, the air inside said electric heating water tank 11 will flow to the water storage bottle 3 via the ventilating pipe 4, and the steam pressure and water vapor produced during the heating progress will be discharged to the water storage bottle 3, and since the water storage bottle 3 is not completely sealed, any excessive pressure may be discharged, so that the pressure in the piping system may be maintained at a same level with outside atmospheric pressure.

Figure 4:
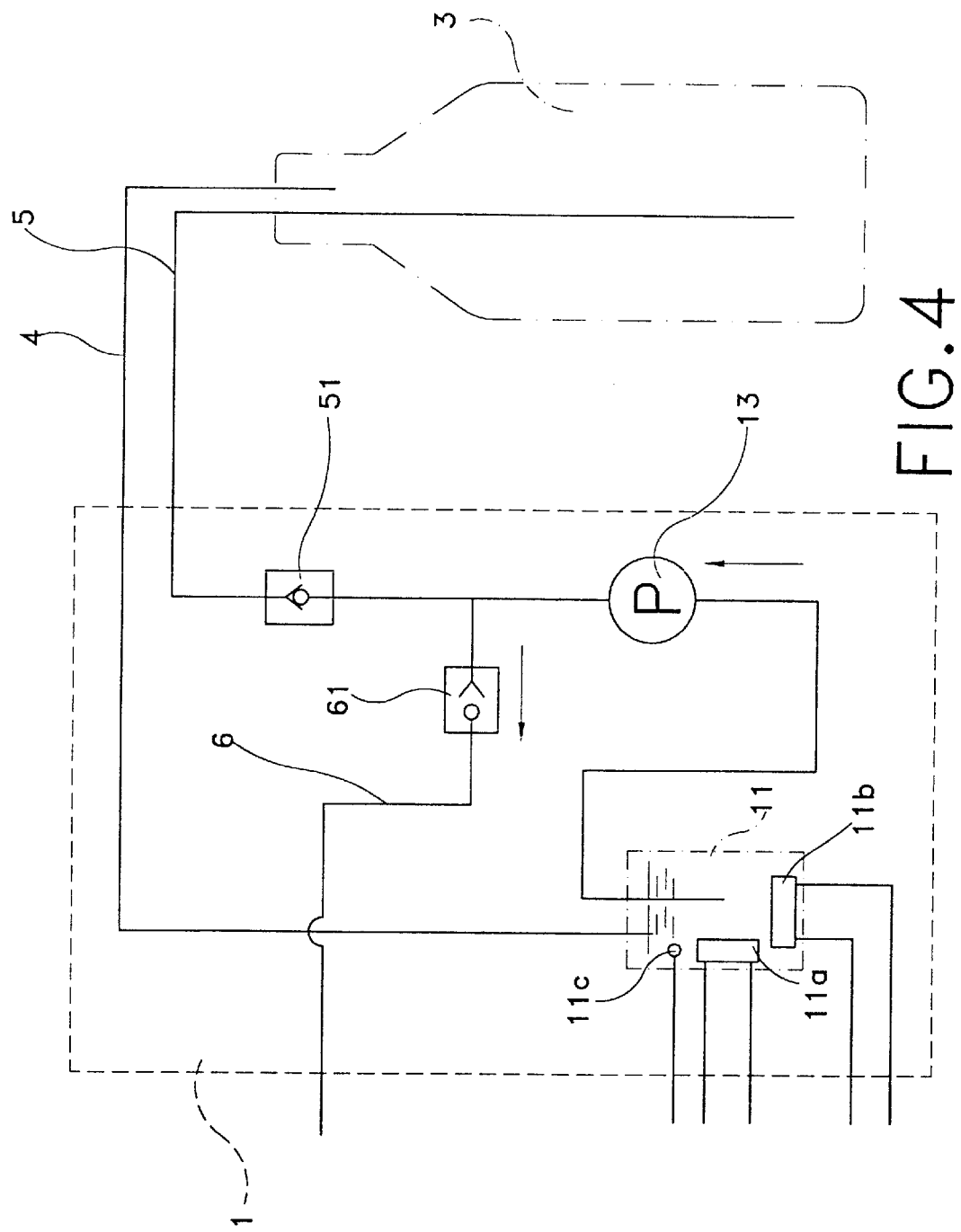
FIG. 4 is a piping view of the invention of water output movement.

When the drinking water is heated to a preset temperature, said control circuit 12 will stop the heating process by the electric heater 11a, and activate the buzzer 121 to give off alarm sound, then a water container may be put below the outlet of the water output pipe 6 of the water take-up rack 2, and when the sensor 23 of said water take-up rack 2 has sensed the existence of the water container, said control circuit 12 will command the two-way water pump motor 13 to rotate in a reverse direction, to draw out the drinking water that is heated in the electric heating water tank 11, then the check valve 51 on the water sucking pipe 5 will be closed, while the check valve 61 on the water output pipe 6 will be opened, so that the heated water may be discharged from the water output pipe 6, to the water container at the outlet of the water output pipe 6, as shown in FIG. 4.

In case a water container is not put at the outlet of the water output pipe 6 of the water take-up rack 2 within the preset time period after the buzzer has sounded the alarm, in other words, when the sensor 23 has not sensed the existence of the water container, said control circuit 12 will not operate and will switch off power.

In case ice water is desired, the user may set the control switch 22 for ice water in the procedures described above, the only difference lies in that the electric heater 11a of the electric heating water tank 11 will not be activated, instead, the cooler 11b is activated to cool the water drawn into the electric heating water tank 11, then the cooled drinking water can be obtained by following the steps described above.

In case lukewarm water is desired, the user may set the control switch 22 for room temperature, and follow the procedures described as before, then the electric heater 11a and the cooler 11b of the electric heating water tank 11 will not be activated, so that the drinking water drawn into the electric heating water tank 11 will not be subjected to a heating or a cooling process, and will be obtained at its room temperature.

Besides, said water take-up rack 2 has a cup placement rack 24, when the desired drinking water is obtained, the cup may be placed on the cup placement rack 24, so that the water will not be spilled.

What is claimed is:

1. A drinking water supply for automobile comprising a main unit box body, a water take-up rack and a water storage bottle, wherein inside said main unit box body is the installation of an electric heating water tank, a control circuit and a two-way water pump, inside said electric heating water tank being the installation of an electric heater, a cooler and a water level sensor, which is in connection with said control circuit, said control circuit being connected to three control switches and a sensor on said water take-up rack; between said electric water tank and water storage bottle being the connection of a ventilating pipe and a water sucking pipe, on said water sucking pipe in said main unit box body being the installation of said two-way water pump, between said two-way water pump and said water storage bottle being the installation of a check valve, between said check valve and said two-way water pump being the connection of a water output pipe, on said water output pipe being the installation of another check valve, the end of said water output pipe being installed on said water take-up rack, and said sensor being located at an appropriate place at the outlet of said water output pipe; said water take-up rack having a cup placement rack.

* * * * *